Sept. 17, 1929.   K. A. WEBER   1,728,647
MEANS FOR BEVELING THE EDGES OF GLASS PLATES
Filed July 28, 1926   3 Sheets-Sheet 1

Sept. 17, 1929.　　　　K. A. WEBER　　　　1,728,647
MEANS FOR BEVELING THE EDGES OF GLASS PLATES
Filed July 28, 1926　　　3 Sheets-Sheet 3

Inventor
Karl Albert Weber
By Lyon & Lyon
Attorneys

Patented Sept. 17, 1929

1,728,647

UNITED STATES PATENT OFFICE

KARL ALBERT WEBER, OF LOS ANGELES, CALIFORNIA, ASSIGNOR TO INTERNATIONAL GLASS MACHINERY CO., A CORPORATION

MEANS FOR BEVELING THE EDGES OF GLASS PLATES

Application filed July 28, 1926. Serial No. 125,391.

This invention relates to a method and means for beveling the edges of glass plates.

In this specification the term "glass" is used in its generic sense to specify glass and materials having like or similar properties or characteristics.

Many attempts have been made to produce a successful machine for commercially beveling the edges of plates of glass. These attempts, however, have been for the most part heretofore unsuccessful, so that the beveling of glass plates for use in mirrors and the like is now manually performed at a great expense requiring skilled operators. The breakage of these plates of glass during the manual beveling thereof is great so that the expense of the cost of beveling the plates of glass is high, limiting the use thereof.

Applicant is aware that many machines or apparatus and methods have been devised and patented for the beveling of the edges of plates of glass, which machines or apparatus, however, have proven to be unsuccessful in operation and inefficient in their operation so that they are not now employed in the commercial beveling of the edges of plates of glass. Many of these machines and apparatus are so designed and constructed and the means of handling are such that the glass breakage resulting from their employment is so great as to prohibit their use.

An object of this invention is therefore to provide a method and means for the beveling of the edges of plates of glass which is commercially applicable and which method and means are so devised, employed and constructed that the breakage of glass is negligible and so that the apparatus may be employed and operated by unskilled labor, and which method and apparatus produces a practically straight beveled edge heretofore practically unobtainable by the manual beveling of glass in a commercial manner.

Another object of this invention is to provide a method and means of beveling the edges of plates of glass in which the glass is automatically handled and beveled and in which the plate of glass is firmly held at its edge during the beveling thereof in engagement with a moving grinding element on a support.

Another object of this invention is to produce an apparatus for the beveling and polishing of the edges of plates of glass to produce a uniform and straight beveled edge or surface, and which apparatus is so organized and constructed that the liability of breakage of the glass or the chipping or fracture thereof is substantially eliminated.

Other objects and advantages of this invention will be apparent from the following detailed description of a preferred embodiment thereof as illustrated in the accompanying drawings, in which drawings:

Figure 6 is an enlarged fragmental sectional view of the grinding element oscillating mechanism embodied in this invention.

Figure 7 is a plan view of the oscillator cam embodied in this invention.

Figure 1:
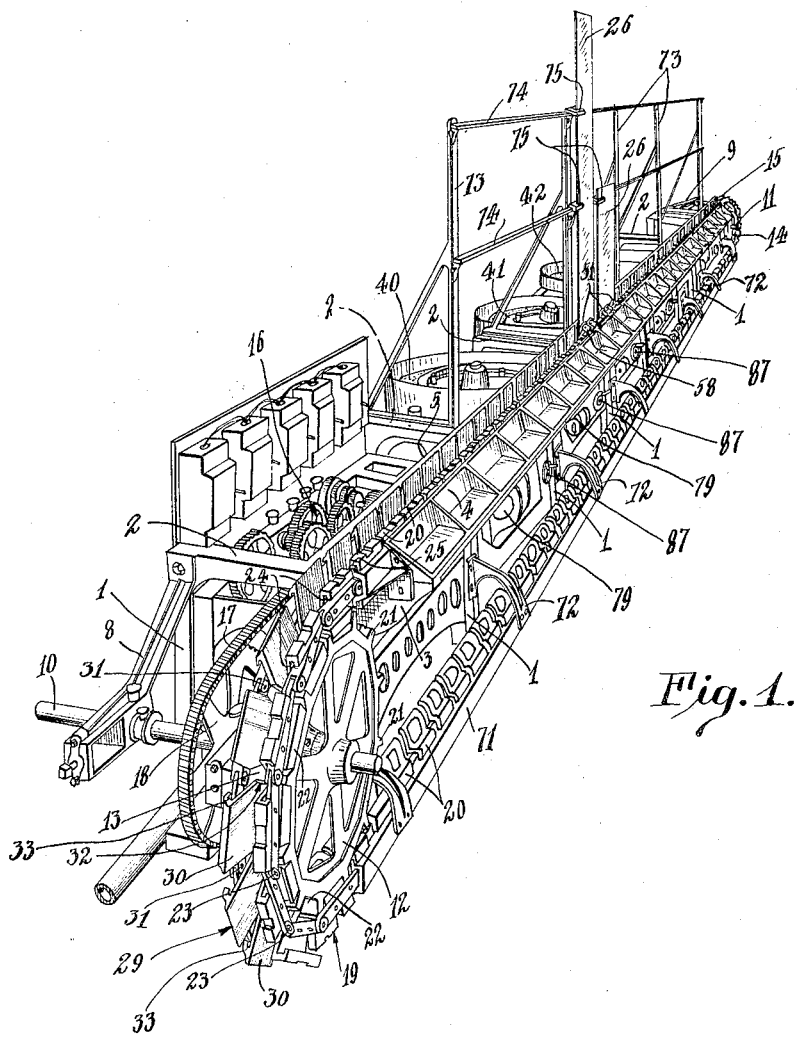
Figure 1 is a perspective view of a glass grinding machine embodying this invention.
Figure 2:
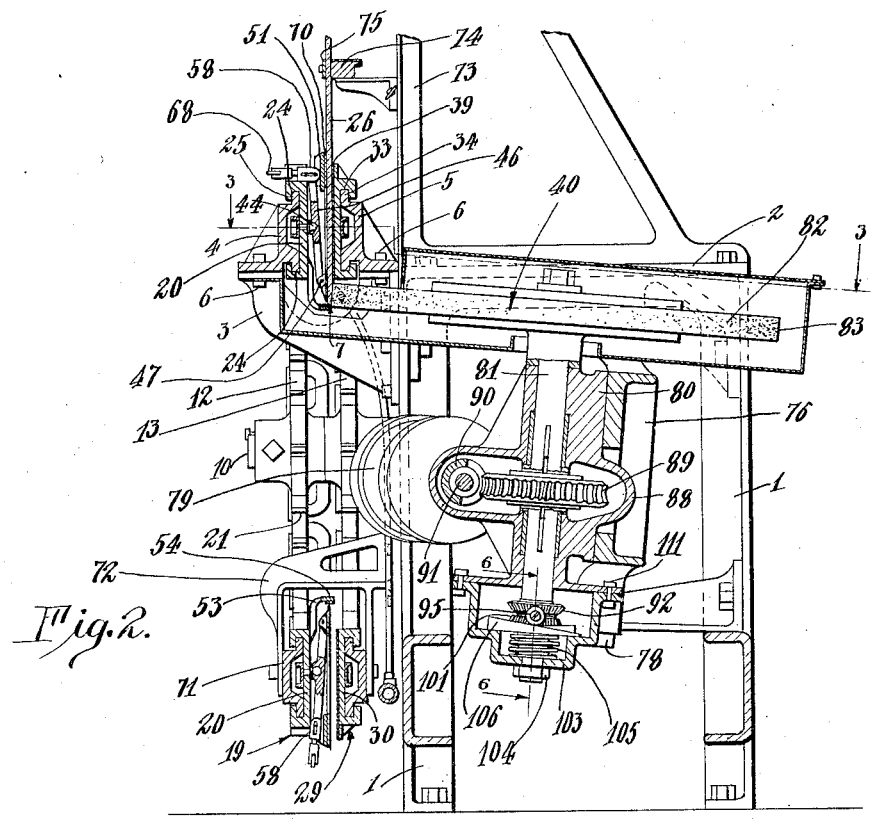
Figure 2 is a sectional end elevation thereof.
Figure 3:
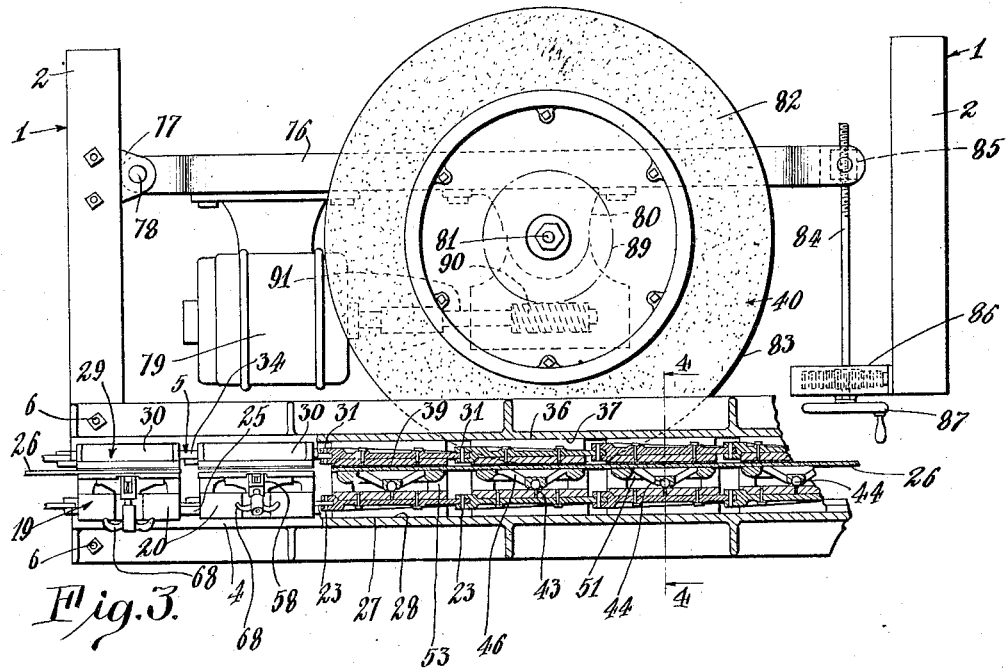
Figure 3 is a top plan view thereof, taken substantially on the line 3—3 of Figure 2.
Figure 4:
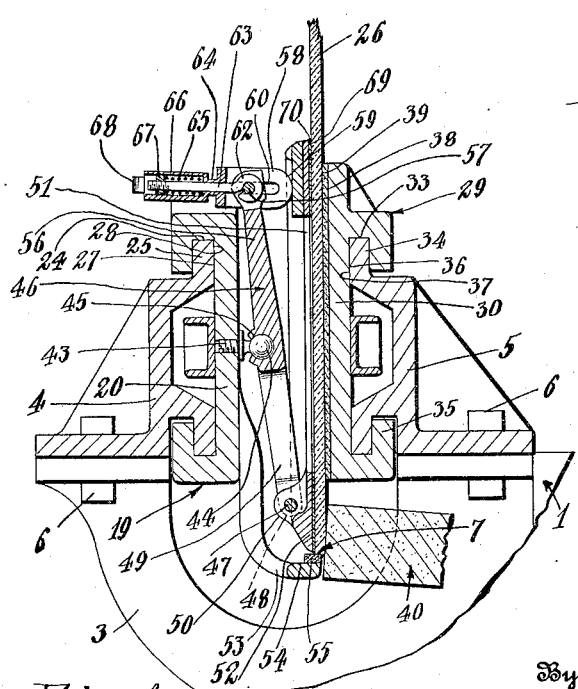
Figure 4 is a fragmental sectional end elevation on an enlarged scale, taken substantially on the line 4—4 of Figure 3.
Figure 5:
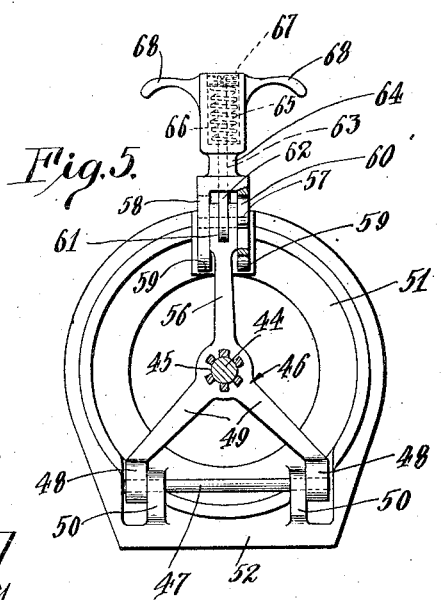
Figure 5 is an enlarged front elevation of clamper mechanism embodied in this invention.

In the preferred embodiment of this invention, illustrated in the accompanying drawings, 1 illustrates spaced uprights secured together by transversely extending members 2, which members 1 and 2 constitute or comprise a frame.

Secured to the forward upright 1 at spaced intervals along the frame are brackets 3, to which brackets 3, spaced guides 4 and 5 are secured by any suitable means, such as illustrated at 6.

Means are provided intermediate the guides 4 and 5 for guidingly supporting and holding a plate of glass substantially in vertical position on a bottom edge 7, which means are preferably of the following construction:

Journaled in brackets 8 and 9 at the opposite ends of the frame are shafts 10 and 11.

Secured to the shafts 10 and 11 are spaced sprockets 12, 13 and 14. The shaft 10 is driven upon a gear reduction means 16, which is mounted in the frame and may be of any desired or preferred construction by a chain 17, which passes over a sprocket 18 which is keyed or otherwise secured to the shaft 10. The reduction gears 16 are driven by any suitable mechanism, such as an electric motor (not shown). Trained over the sprockets 12 and 14 is a conveyor 19, which conveyor 19 is composed of plate links 20 and the teeth 21 of the sprockets 12 and 14 are spaced apart so as to accommodate the inner tapered engaging ends 22 of the plate links 20. The plate links 20 are pivotally secured together at pins 23.

The plate links 20 are formed at their upper and lower ends with guide channels 24, in which guide channels 24, guide sections 25 of the guide 4 are adapted to fit as the plate links 20 pass along the guide 4. The guide 4 guides the plate links 20 as the same are driven along in the position in which the same occupy for conveying and holding the glass plates 26 during the beveling thereof, and the glass plates 26 during the beveling thereof and their inner surfaces 27 engage the outer surfaces 28 of the plate links 20 so as to provide a bearing during the guiding of the plate links 20 so as to prevent lateral displacement or movement of the plate links 20 relative to the guide 4.

Trained over the sprockets 13 and 15 is a second conveyor 29 which comprises plate links 30 which are pivotally secured together at pins 31. The plate links 30 are likewise tapered at their lower ends as illustrated at 32 and the teeth of the sprockets 13 and 15 are spaced and formed so as to permit and accommodate the tapered ends of the plate links 30 as the same pass over the sprockets 13 and 15. The plate links 30 are provided with guide channels 33 into which the guide channels 34 and 35 of the guide 5 fit during the driving of the conveyor 29 and the outer surface 36 of the guide 5 bears against the inner surface 37 of the plate links 30 during the guiding of the links 30 so as to prevent lateral displacement of the guide links 30 relative to the guide 5. The inner surface 38 of the plate links 30 is provided with a non-abrasive engaging surface material 39, such as hard rubber or the like to prevent scratching or marring of the side of the glass plate 26.

Means are provided intermediate the conveyors 19 and 29 for supporting the glass plate 26 on its edge 7 and for clamping the glass plate 26 between the plate links 20 and 30 so as to provide a moving line of support for the glass plate 26 and so as to firmly hold the plate of glass from transverse movement between the links 20 and 30 during its engagement with the grinding elements 40, 41 and 42, which means are preferably of the following construction:

Screw-threaded to the plate links 20 are pins 43, which pins 43 have bolt heads 44 which fit into sockets 45 formed at the center of a three-point suspension bracket 46, which three-point suspension bracket 46 is pivotally supported at a pin 47 which passes through eyes 48 formed at the lower extremities of the arms 49 of the frame 46 and through eyes 50 formed integral with or secured to an engaging plate 51, which engaging plate 51 is herein illustrated as comprising a ring and presenting a lower tapered section 52 which extends downward and supports the plate of glass substantially at its lower edge 7 where the same is supported upon the curved extension 53 of the plate link 20, which curved extension 53 terminates in a flat supporting surface 54 upon which a strip of non-abrasive material 55 is secured and against which strip of non-abrasive material 55, the edge 7 of the glass plate 26 rests. Pivotally secured at the upper extremity of the arm 56 of the frame 46 at a pin 57 is a yoke 58, which has a curved engaging edge 59. The pin 57 passes through an elongated slot 60 formed in the yoke 58.

Mounted on the pin 57 in a slot 61 in the boss formed at the extremity 56 is an eye-bolt 62, which eye-bolt 62 passes through a bore 63 formed in the shank 64 of the yoke 58 and a compression spring 65 is mounted on the eye-bolt 62 within a chamber 66 formed at the end of the yoke 58. An adjustment nut 67 is screw-threaded to the end of the bolt 62 for engaging and adjusting the spring 65. Outwardly extending finger sections 68 are formed integral with the yoke 58. The engaging plate 51 is provided at its engaging face 69 with a surface cover of non-abrasive material 70, such as felt or the like.

Guides 71 are supported at the lower end of the frame 1 in brackets 72 and the guides 71 are similar to the guides 4 and 5 and are for the purpose of guiding the conveyors 19 and 29 as the same pass along the lower edge of the frame 1 as the plates 26 have been removed from between the same.

Means are provided for supporting the glass plates 26 at points spaced from the line of support provided on the strips of non-abrasive material 55, which means preferably comprise uprights 73 secured in spaced relation to the frame 1 and to which uprights longitudinally extending guides 74 are secured and along which guides 74 engaging brackets 75 are guided and engage the edge or edges of the plates of glass 26 in a manner similar to that shown in the patent for Machine for grinding glass plates, No. 1,571,985, issued February 9, 1926 to me.

Means are provided mounted in the frame 1 for beveling the edges of the plates of glass as the same are conveyed along the frame 1 between the conveyors 19 and 29 and which means are preferably of the following construction:

Mounted on an arm 76, pivoted at brackets 77 secured to one of the uprights 1 at a pin 78 is a motor 79. Secured to the arm 76 is a bracket 80, through which bracket 80 a shaft 81 is journaled and to the upper end of which bracket 81 a grinding element 82 formed of an abrasive material, such as carborundum, or the like, is secured. The arm 76 and bracket 80 are mounted in an inclined position so that the engaging edge 83 of the grinding element 82 is inclined relative to the plane of the glass plate 26.

Means are provided at the opposite end of the arm 76 for adjusting the position of the grinding element 82 relative to the glass plate 26, which means preferably comprise a screw 84 which is screw-threaded into a nut 85 mounted at the end of the arm 76 and which screw is journaled in a bracket 86 secured to one of the uprights 1 and is provided with a hand-wheel 87 for operation.

Keyed to the shaft 81 in a housing 88, provided by the bracket 80, is a worm gear 89, which worm gear 89 meshes with a worm 90, which worm 90 is secured to the drive shaft 91 of the motor 79.

Means are provided for reciprocating the grinding element 82 substantially transversely to the line of support of the glass plate 26 during the driving or motion of the grinding element 82 for the purpose of insuring a uniform wear of the engaging edge 83 of the grinding element 82, which means are of the following construction:

Secured to the lower end of the shaft 81 is a bevel gear 92, which bevel gear 92 meshes with bevel gears 93 and 94, respectively. Formed integral with the bevel gears 93 and 94 are cam rollers 95 and 96. Pins 97 secure the bevel gears 93 and 94 to a bearing race 98, which bearing race 98 surrounds a second bearing race 99 which is journaled upon an extension 100 of a bevel gear 101. The bevel gear 101 meshes with the bevel gears 93 and 94 and is secured in position and from rotation by a square stud 102 which passes through and is secured in position within and to the housing 103 by means of a nut 104. The housing 103 encloses the entire gear assembly provided by the bevel gears 92, 93, 94 and 101.

Mounted intermediate the bevel gear 101 and the gear housing 103 is a compression spring 105. The bevel gear 101 is slidably mounted on the stud 102 and the compression spring 105 maintains the bevel gear 101 and mesh with the bevel gears 93 and 94.

Mounted in the housing 103 is a double faced cam 106 which provides a cam face 107 on which the cam roller 96 rolls and a cam face 108 upon which the cam roller 95 rolls.

The cams 107 and 108 are complementary cams formed with their high points 109 and 110 at diametrically opposed positions and low points likewise at diametrically opposed positions so that the cam rollers 95 and 96 are at all times in engagement with the cam faces 107 and 108. The gear housing 103 is secured by any suitable means such as illustrated at 111 to the bracket 80. The bevel gears 92, 93, 94 and 101 provide such a gear ratio that the grinding element 82 is reciprocated substantially vertically of more than twice during each complete revolution of the grinding element 82. Being reciprocated twice and a fraction of a reciprocation more during each revolution of the grinding element 82 insures such an irregularity of the grinding element 82 thereof that the grinding element will wear evenly.

The operation of the glass beveling machine embodying this invention is:

The engaging plates 51 are first secured to a conveyor 19. The plates of glass are then inserted between the conveyors 19 and 29 with their edges 7 upon the non-abrasive strips 55 and the yoke 58 is actuated to clamp the same into position. The motor is then started to drive the conveyors 19 and 29 or the glass may be positioned between the conveyors 19 and 29 during the driving of the conveyors, as the drive thereof is relatively slow. The motors which drive the grinding element 82 and the grinding elements 41 and 42 are then set into operation and the plate of glass is conveyed along the frame provided by the uprights 1, past the grinding elements 82, the grinding element 41. which is preferably a finer grinding stone than the grinding stone 82 and has a polishing wheel 42 which completes the grinding and polishing of the beveled edge.

Having fully described a preferred embodiment of my invention, it is to be understood that I do not wish to be limited to the exact details herein set forth which may obviously be varied without departing from the spirit of my invention as set forth in the appended claims.

I claim:

1. A machine for beveling an edge of a glass plate, comprising supporting means upon which the glass may be stood on edge in substantially vertical position, spaced conveyors mounted above the supporting means, grinding means moving adjacent the line of support provided by the supporting means, and means secured to one conveyor and for engaging the plate of glass to hold the same substantially rigidly against the other conveyor as the same is moved into engagement with the said grinding means.

2. A machine for beveling an edge of a glass plate, comprising a frame, spaced endless conveyors mounted on sprockets at the ends of the said frame, means for supporting the edge of a plate of glass, grinding means moving adjacent the line of support provided by the supporting means, and means secured to the said conveyors between which the said plate of glass is held substantially against transverse movement as the said plate is moved into engagement with the said grinding means.

3. A machine for beveling an edge of a glass plate, comprising supporting means upon which the glass plate may be stood on its edge, spaced endless conveyors mounted above the supporting means, means secured to the spaced conveyors for gripping and conveying the plate of glass, grinding means moving adjacent the line of support provided by the supporting means, means for moving the said grinding means, and means for reciprocating the said grinding means substantially transversely to the line of support during the motion thereof.

4. A machine for beveling an edge of a glass plate, comprising supporting means upon which the glass may be stood on its edge, spaced endless conveyors, grinding means moving adjacent the line of support provided by the supporting means, a clamp member secured to one of the spaced conveyors and adapted to engage the side of the plate of glass to hold the opposite side thereof against the other conveyor to hold the plate of glass substantially against transverse movement as the said plate is moved into engagement with the said grinding means, and means for driving the said spaced conveyors.

5. A machine for beveling an edge of a glass plate, comprising a frame, spaced endless conveyors mounted on the frame, means for supporting the glass plate on edge, grinding means moving adjacent the line of support provided by the supporting means, a three-point suspension bracket secured to one of said conveyors in position to engage the side of the glass plate and hold the same against the other of said conveyors, and means for driving the conveyors to move the glass plate into engagement with the said grinding means.

6. A machine for beveling an edge of a glass plate, comprising grinding means, a frame, spaced endless conveyors, sprockets mounted at the ends of the said frame over which the said conveyors are trained, means for driving the sprockets at one end of the said frame, and releasable clamping means secured to one of the said conveyors and between which means and the other said conveyor the said plate of glass is held substantially against transverse movement as the said glass plate is moved into engagement with the said grinding means.

7. A machine for beveling an edge of a glass plate, comprising grinding means, a frame, spaced guides secured to the said frame, a conveyor guided by each of the said guides, means secured to one of the said conveyors and between which means and the other of said conveyors the said glass plate is held substantially against transverse movement as the said plate is moved into engagement with the said grinding means.

8. A machine for beveling an edge of a glass plate, comprising a frame, spaced endless conveyors mounted on sprockets at the ends of said frame, spaced guides secured to the said frame for guiding the said endless conveyors, means for supporting the glass plate, grinding means moving adjacent the line of support provided by the supporting means, means for driving the said grinding means adjacent the line of support, and means associated with the said driving means and adapted to reciprocate the said grinding means transversely of the line of support, and means secured to the said conveyors between which the said glass plate is held substantially against transverse movement as the said plate is moved into engagement with the said grinding means.

9. A machine for beveling an edge of a glass plate, comprising supporting means upon which the glass plate may be stood on edge in substantially vertical position, means for guidingly maintaining the plate of glass in such position, grinding means moving adjacent the line of support of the glass plate provided by the supporting means and located at one side of the center plane of the plate of glass and at an angle to the said glass plate, and means for substantially rigidly holding the edge of the plate of glass in engagement with the grinding means during the beveling thereof.

10. In a machine for beveling an edge of a plate of glass, the combination of supporting means, endless conveyor members spaced apart over the supporting means, means secured to one of the conveyors between which and the other conveyor the plate of glass is adapted to stand on edge on the supporting means for gripping a plate of glass on its sides to convey the glass plate along the support, grinding means moving adjacent the line of feed of the glass plate and presenting a grinding edge partly above the line of support and at an angle to the plane of the glass plate.

11. In a device of the class described, the combination of means for supporting a plate of glass substantially on edge, spaced endless conveyors mounted over the supporting means and between which the plate of glass is supported, grinding means moving adjacent the line of support provided by the supporting means, means pivotally secured to one of the conveyors for holding the edge of the plate of glass against the other conveyor and substantially rigidly between the conveyors as the plate of glass is moved into engagement with the grinding means.

12. In a device of the class described, the combination of spaced endless conveyors between which a plate of glass is adapted to be supported in substantially vertical position, means for clamping the glass plate between the conveyors, grinding means moving adjacent the line of support on which the glass is stood in substantially vertical position, and means for driving the conveyors to move the plate of glass into engagement with the grinding means.

13. In a device of the class described, the combination of a pair of spaced guides, a pair of endless conveyors slidingly mounted in the guides, means for supporting a glass plate in substantially vertical position between the conveyors, grinding means moving adjacent the line of support provided by the supporting means, and means for driving the conveyors to move the plate of glass into engagement with the grinding means.

14. A machine for beveling an edge of a glass plate comprising a frame, spaced endless conveyors mounted on sprockets at the ends of the frame, means for supporting the edge of the glass plate, the endless conveyors including links, the inner face of the links of one conveyor being faced with a resilient material, clamps adapted to be removably secured to the links of the other conveyor for clamping the edge of the glass plate against the resilient face of the links of the other conveyor, grinding means moving in the line of support, and means for driving one of the sprockets.

15. In a glass grinding machine, the combination of a pair of spaced guides, a pair of endless conveyors comprising links adapted to be slidably mounted in the guides, means for gripping a plate of glass between the conveyors, means for supporting the glass plate in substantially vertical position between the conveyors, grinding means moving adjacent the line of support of the glass plate as held in substantially vertical position between said conveyors, and means for driving the conveyors to move the plate of glass into engagement with the grinding means.

Signed at Los Angeles, California, this 22nd day of July, 1926.

KARL ALBERT WEBER.